United States Patent [19]

Showalter

[11] Patent Number: 4,586,752
[45] Date of Patent: * May 6, 1986

[54] SOLUTION MINING PROCESS

[75] Inventor: William E. Showalter, Seal Beach, Calif.

[73] Assignee: Union Oil Company of California, Los Angeles, Calif.

[*] Notice: The portion of the term of this patent subsequent to Aug. 8, 1992 has been disclaimed.

[21] Appl. No.: 14,936

[22] Filed: Feb. 26, 1979

Related U.S. Application Data

[63] Continuation-in-part of Ser. No. 894,936, Apr. 10, 1978, Pat. No. 4,358,157, and Ser. No. 903,257, May 5, 1978, Pat. No. 4,358,158, each is a continuation-in-part of Ser. No. 767,788, Feb. 11, 1977, Pat. No. 4,105,253.

[51] Int. Cl.⁴ .................. E21B 43/28; E21B 43/30
[52] U.S. Cl. .................... 299/4; 166/245; 166/263
[58] Field of Search ............ 299/2, 4, 5; 166/263, 166/268, 245

[56] References Cited

U.S. PATENT DOCUMENTS

| | | | |
|---|---|---|---|
| 2,818,240 | 12/1957 | Livingstone | 299/4 |
| 3,130,960 | 4/1964 | Martin | 299/4 X |
| 3,278,233 | 10/1966 | Hurd et al. | 299/4 |
| 3,525,396 | 8/1970 | Chew | 166/263 |
| 3,708,206 | 1/1973 | Hard et al. | 299/4 |
| 3,713,698 | 1/1973 | Rhoades | 299/4 |
| 3,792,903 | 2/1974 | Rhoades | 299/5 |
| 3,845,817 | 11/1974 | Hoyt et al. | 166/263 |
| 3,999,803 | 12/1976 | Coursen | 299/4 |
| 4,032,194 | 6/1977 | Howell | 299/4 |
| 4,066,297 | 1/1978 | Spence | 299/4 |
| 4,079,783 | 3/1978 | Snavely | 299/4 |
| 4,082,358 | 4/1978 | Learmont | 299/4 |
| 4,105,253 | 8/1978 | Showalter | 299/4 |
| 4,129,334 | 12/1978 | Stover | 299/4 |
| 4,134,618 | 1/1979 | Kossack | 299/4 |

FOREIGN PATENT DOCUMENTS 498223 4/1977 Australia.

OTHER PUBLICATIONS

License Permit Application No. SUA1223, filed by Minerals Exploration Company, Union Oil Center, 461 South Boylston, Los Angeles, California 90017, Jul. 28, 1977.

"Winning of Useful Elements from Minerals by Leaching Underground", *Mining Magazine,* vol. 118, No. 2, Feb. 1968, pp. 129, 131, 133 and 134.

*Primary Examiner*—George A. Suchfield
*Attorney, Agent, or Firm*—Dean Sandford; Daniel R. Farrell

[57] ABSTRACT

A solution mining process for recovering mineral values from a subterranean mineral-bearing formation, which includes (1) a first injection-and-production phase during which a leaching solution is injected into the formation and a pregnant liquor is simultaneously recovered from the formation, (2) a production-only phase during which injection is suspended and additional pregnant liquor is recovered from the formation, and (3) a second injection-and-production phase.

25 Claims, 2 Drawing Figures (1)

SOLUTION MINING PROCESS

RELATED APPLICATIONS

This is a continuation-in-part of copending applications Ser. No. 894,936, filed Apr. 10, 1978, now U.S. Pat. No. 4,358,157, and Ser. No. 903,257, filed May 5, 1978, now U.S. Pat. No. 4,358,158 which in turn are continuations-in-part of application Ser. No. 767,788, filed Feb. 11, 1977, now U.S. Pat. No. 4,105,253.

BACKGROUND OF THE INVENTION

1. Field of the Invention

This invention relates to the recovery of mineral values from subterranean formations and more particularly to a process for leaching subterranean mineral deposits to recover mineral values therefrom.

2. Description of the Prior Art

Solution mining involves the in situ leaching of mineral values from a subterranean mineral-bearing formation. Typically a leaching solution is injected through a well into the formation to solubilize the desired mineral values and thereby form a pregnant liquor. The pregnant liquor is then recovered and treated to separate the mineral values therefrom. An oxidant may also be injected into the formation to aid in solubilizing mineral values which are only soluble, or are more readily soluble, in an oxidized form.

In the conventional solution mining process, the leaching solution is injected continuously into the mineral-bearing formation through one or more injection wells and the pregnant liquor is recovered continuously through one or more production wells. The rate of mineral recovery, and perhaps the ultimate mineral recovery, may be increased by changing the direction of flow through the formation by converting one or more of the injection wells to production wells and vice versa, thereby reversing the direction of flow through the formation, or by shutting in the initial injection wells and converting some of the production wells to injection wells, thereby forcing leaching solution through previously unleached portions of the formation. In any event, the injection-and-production phase is normally continued until the mineral-bearing formation is exhausted of the desired mineral values or, as a practical matter, until further operations become uneconomical.

After the injection-and-production phase has been completed, it may be desirable to restore the mineral-bearing formation and the ground water contained therein to substantially their pre-leach condition. Typically, the restoration operation will include a production-only phase during which ground water is pumped out of all of the wells employed in the solution mining operation to thereby remove any remaining leaching solution and/or oxidant. After completion of the production-only phase, the wells are generally abandoned.

The cost of the chemicals employed in a particular solution mining process and the cost of restoring the subterranean mineral-bearing formation to its pre-leach condition are major factors in determining the economic viability of that process. The solution mining processes disclosed in my U.S. Pat. No. 4,105,253 and my copending applications Ser. No. 894,936, filed Apr. 10, 1978 and Ser. No. 903,257, filed May 5, 1978 result in a substantial reduction in these costs as compared to other solution mining processes. However, further cost reductions are desirable.

Accordingly, it is a primary object of this invention to provide an improved method for the solution mining of mineral values from subterranean formations in which the chemical costs and costs of formation restoration are substantially reduced.

Another object of this invention is to provide an improved solution mining process in which the rate of recovery and the ultimate recovery of the desired mineral values are increased while at the same time the cost of the solution mining process is reduced.

Further objects, advantages and features of the invention will become apparent to those skilled in the art from the following description when taken in conjunction with the accompanying drawings.

SUMMARY OF THE INVENTION

Briefly, the invention provides a solution mining process having (1) a first injection-and-production phase, (2) a production-only phase and (3) a second injection-and-production phase. During the injection-and-production phases, a leaching solution is injected through at least one well into the formation to solubilize the desired mineral values and form a pregnant liquor, while the pregnant liquor is simultaneously recovered through at least one other well. During the production-only phase, injection of the leaching solution is suspended and additional pregnant liquor is recovered through at least one of the wells. It has been discovered that the suspension of leaching solution injection during the production-only phase unexpectedly does not impede and, in fact, may enhance the rate of mineral recovery. The cost of the leaching solution chemicals and the cost of restoring the formation to its pre-leach condition are also reduced by the use of a production-only phase between injection-and-production phases in the solution mining process of this invention.

BRIEF DESCRIPTION OF THE DRAWINGS

The invention will be more readily understood by reference to the drawings, wherein.

DETAILED DESCRIPTION OF THE INVENTION

Figure 1:
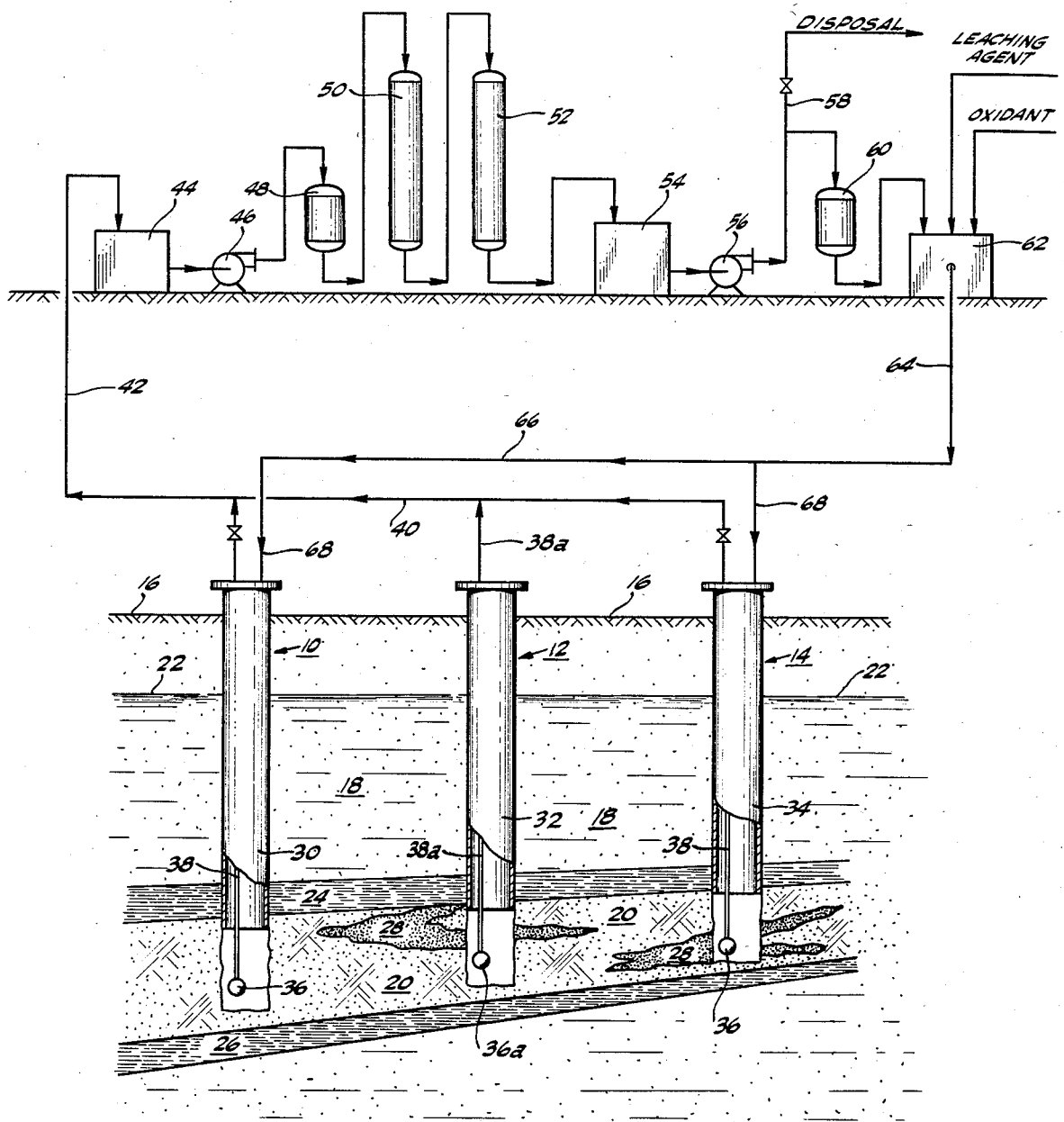
FIG. 1 is a schematic diagram of three wells penetrating a subterranean mineral-bearing formation and of the surface facilities employed in one embodiment of the method of this invention.

The method of this invention is suitable for the solution mining of a wide variety of mineral values from subterranean mineral-bearing formations, such as the solution mining of uranium, vanadium, molybdenum, nickel, copper, the rare earth elements and the like. The method is particularly suited to the recovery of such mineral values from subterranean formations which are at least partially submerged in native ground water.

In solution mining, a leaching solution in which the desired mineral values are soluble is introduced into the mineral-bearing formation. Leaching solutions suitable for use in the method of this invention include acidic, neutral and alkaline solutions containing one or more leaching agents for solubilizing the desired mineral values. Suitable acidic leaching solutions include aqueous solutions containing sulfuric acid, hydrochloric acid, nitric acid and/or an organic acid, such as oxalic acid. Suitable alkaline leaching solutions include aqueous alkaline solutions containing an alkali metal carbonate, an alkali metal bicarbonate, ammonium carbonate and/or ammonium bicarbonate. The concentration of the leaching agent in the leaching solution is a matter of choice within the parameters known to those skilled in the art.

A highly preferred leaching solution for use in the method of this invention is a dilute aqueous carbonic acid solution. The phrase "dilute carbonic acid solution" as used herein means a non-alkaline solution containing carbon dioxide in solution, normally in the form of carbonic acid and/or dissociated carbonic acid, i.e., hydronium cations and bicarbonate anions. The solution will of course contain a certain amount of bicarbonate salts, such as sodium bicarbonate and potassium bicarbonate, and various other anions and cations which are either present in the water used to make the solution or which are inherently leached from the subterranean formation during the recirculation of the leaching solution.

The concentration of carbonic acid should be at least sufficient to maintain the pH of the leaching solution at about 7 or below. At pH values substantially above 7, such as pH of 8 or higher, the carbonic acid and bicarbonate anions are converted to carbonate anions which tend to cause plugging and scaling problems. Generally the pH of the dilute carbonic acid solution will be less than about 7, and good results are obtained when the pH is between about 6 and about 7.

The dilute carbonic acid leaching solutions preferred for use in the method of this invention generally are not saturated in carbon dioxide. At 50° F. and one atmosphere pressure, the solubility of carbon dioxide in water is about 2,340 ppm of carbon dioxide, which expressed as bicarbonate anion is about 3,200 ppm. For the sake of uniformity, the concentration of carbon dioxide, carbonic acid and bicarbonate is herein expressed collectively in terms of the bicarbonate ion, this being a simple and convenient measure of these concentrations. Accordingly, the dilute carbonic acid leaching solution will generally contain less than about 2,500 ppm of bicarbonate ion. Preferably, the leaching solutions employed in the method of this invention have a bicarbonate ion concentration between about 380 ppm and about 1,000 ppm, and good results are obtained when the solution contains between about 460 ppm and about 700 ppm of bicarbonate ion. The carbonic acid concentration of the leaching solution is preferably controlled within the above stated limits to provide a bicarbonate ion concentration in the pregnant liquor between about 600 and about 750 ppm.

Preferably, the fresh leaching solution is formed by dissolving carbon dioxide in water. The water used is preferably ground water native to the subterranean formation to be leached. It is contemplated that the leaching solution can be made by dissolving the water-soluble bicarbonate salts, such as sodium or potassium bicarbonate, in water and acidifying the solution thus formed to the desired pH, preferably by dissolution of carbon dioxide into the solution. In whatever manner the solution is formed, of course, upon circulation through the subterranean deposit, the solution will accumulate various cations which are ionically exchanged from the formation by the leaching solution. By the preferred method, i.e., dissolving carbon dioxide in the native ground water, no extraneous cations are introduced into the subterranean formation, thereby simplifying the subsequent restoration of the formation to its pre-leach condition. The carbon dioxide may be added to the barren liquor in a centrally located mixing tank or may be introduced directly into the injection well for admixture with water. The introduction of carbon dioxide directly into the injection well often results in an increase in the injectivity of the well, as disclosed in U.S. Pat. No. 4,105,253, the disclosure of which is herein incorporated by reference.

It is often beneficial to inject an oxidant into the mineral-bearing formation during a solution mining operation in order to oxidize the mineral values to a more readily soluble oxidized form. For example, uranium often occurs naturally in the relatively insoluble tetravalent state but becomes much more readily soluble when oxidized to the hexavalent state. The oxidant may be injected continuously or intermittently as best suits the operation. The oxidant may be introduced at the same time as the leaching solution, either through the same well or a different well, or may be introduced in a plurality of discrete slugs alternated with discrete slugs of the leaching solution. Preferably the oxidant is dissolved in the leaching solution for introduction into the mineral-bearing formation. The oxidant may be added to the leaching solution in a centrally located mixing tank or may be introduced directly into the injection well for solubilization thereof in the leaching solution. Gaseous oxidants may advantageously be introduced through a conduit extending into the column of leaching solution in the injection well, thereby taking advantage of the hydrostatic head of the fluid column to dissolve higher concentrations of the oxidant.

Any of the conventionally used oxidizing agents can be employed as the oxidant in the present invention. For example, potassium permanganate, potassium ferricyanide, sodium hypochlorite, potassium peroxydisulfate, hydrogen peroxide, oxygen or oxygen-containing gases can provide the necessary oxidant. Hydrogen peroxide and oxygen are preferred oxidants, with relatively pure, commercially available oxygen being particularly preferred.

Where the oxidant is dissolved in the leaching solution, the concentration of oxidant in the oxidant-containing leaching solution thus formed can vary widely. As a practical matter, the concentration of oxidant will be between about 50 ppm on a free oxygen basis and the concentration at which the leaching solution is saturated with the oxidant at the downhole conditions in the injection well adjacent the formation to be leached. Preferably, the oxidant concentration is between about 100 and about 300 ppm on a free oxygen basis. The term "on a free oxygen basis" is used herein to define the concentration of dissolved elemental and molecular oxygen, and oxygen-containing compounds, such as a water-soluble peroxide, in which the oxygen is readily available for oxidation of the mineral values. Good results are obtained with an oxidant concentration of about 200 ppm on a free oxygen basis. Oxygen-containing gases, particularly relatively pure oxygen, are preferred for use as the oxidant in this method due to their relatively low cost and ease of handling.

The method of this invention involves separate injection-and-production and production-only phases. The injection-and-production phases of the method involve the simultaneous injection of leaching solution through at least one of a plurality of wells into the mineral-bearing formation and production of pregnant liquor through another of the plurality of wells. The number of injection and production wells and the spacing therebetween may vary widely depending, inter alia, on the shape and size of the mineral-bearing formation. Additionally the pattern of injection and production wells may also vary widely from a single injection well and a single production well to a complicated series of adjacent polygonal-shaped well patterns totaling one hundred wells or more. Typically, a mixture of five-spot, six-spot and seven-spot well patterns will be situated along a previously defined mineral trend in order to develop the mineral-bearing formation. The selection of a particular pattern of wells or a particular ratio of injection wells to production wells is not deemed critical, but rather in considered to be a matter of choice according to factors known to a skilled artisan.

Due to the use of separate injection-and-production and production-only phases in the method of this invention, and due to the preferred method of having the various well patterns used in a commercial solution mining process operating in different phases of this method, it is desirable to differentiate between the various portions of the mineral-bearing formation which are in each of the two phases. Accordingly, the term "participating volume" has been selected to describe that portion of the mineral-bearing formation which corresponds to a particular surface well pattern, i.e., the fluid flow through a participating volume is predominately if not exclusively determined by the injection and/or production rates in the particular surface well pattern associated with that participating volume. The participating volume is that volume of the mineral-bearing formation which receives leaching solution from and/or produces pregnant liquor into a given plurality of wells. One convenient measure of the participating volume associated with a particular group of wells is the volume enclosed within the fluid streamlines which trace the fluid flow within the formation from the injection wells to the production wells of a given well pattern. Where a first pattern of wells is closely adjacent to other well patterns, such that the injection and/or production operations in the other patterns have an appreciable effect on the fluid streamlines outside the plan view periphery of the first well pattern, a more convenient measure of the participating volume is the volume of the formation which underlies and falls within the plan view periphery of the first well pattern. In any event, the participating volume corresponding to a particular group of wells is an identifiable portion of the mineral-bearing formation which can be distinguished from other portions of the formation.

Referring to FIG. 1, wells 10, 12 and 14 extend from the earth surface 16 through overburden 18 into mineral-bearing subterranean formation 20. Formation 20 is situated below the normal water level, indicated by line 22, of the native ground water, and, ideally, between relatively fluid-impermeable layers 24 and 26. Layers 24 and 26 aid in the containment of the leaching solution within mineral-bearing formation 20, and may be layers of water-swellable clay, or other formation materials having a relatively low permeability to water, such as compacted siltstone, mudstone or shale. Although the mineral values occur in varying concentrations throughout mineral-bearing formation 20, typically one or more mineral deposits 28 located in formation 20 will have a relatively high concentration of the desired mineral values. The participating volume of formation 20 defined by the fluid streamlines between and among wells 10, 12 and 14 includes mineral deposits 28.

Wells 10, 12 and 14 have casings 30, 32 and 34, respectively, for sealing the well from the fluids in overburden 18 in the conventional manner. All three wells are completed for production by suspending downhole pumps 36 and 36a therein from conduits 38 and 38a, respectively. Pumps 36 and 36a discharge into conduits 38 and 38a which conduct the pumped fluid via header 40 and conduit 42 to pregnant liquor holding tank 44. From tank 44, the pregnant liquor is pumped by pump 46 through sand filter 48, vessels 50 and 52 which contain an ion exchange resin for separating the mineral values from the pregnant liquor to form a barren liquor, and into barren liquor holding tank 54. From tank 54, the barren liquor is pumped by pump 56 through conduit 58 for disposal and/or through sand filter 60 to mixing tank 62 for mixing with the leaching agent and, if required, an oxidant. Typically, pump 56 will provide the pressure for injection of the leaching solution into formation 20. Alternatively, a separate pump, not shown, can pressurize the leaching solution for injection via conduit 64, header 66 and conduits 68 into wells 10 and 14. When the leaching solution can be injected through wells 10 and 14 solely under the hydrostatic head of the solution in those wells, pump 56 need only provide sufficient pressure to pump the leaching solution to the wellheads of wells 10 and 14.

Suitable piping and valves, not shown, are provided for periodic backwashing and cleaning of filters 48 and 60, and for regenerating the ion exchange resins in vessels 50 and 52. The above-described surface facilities are, of course, merely exemplary and do not per se form a part of this invention. Other equivalent surface facilities for separating the mineral values from the pregnant liquor are known in the art and are suitable for use in the method of this invention.

During the injection-and-production phases of the method of this invention, barren liquor is pumped from tank 54 by pump 56 through sand filter 60 into mixing tank 62. A leaching agent and, optionally, an oxidant are introduced into mixing tank 62, as required, to mix with the barren liquor and thereby form the leaching solution. Under the pressure supplied by pump 56, the leaching solution is conducted via conduit 64, header 66 and conduits 68 into wells 10 and 14. The leaching solution is introduced through wells 10 and 14 into formation 20 by means of the pressure supplied by pump 56 or, alternatively, under the pressure supplied by the hydrostatic head of the leaching solution in wells 10 and 14.

While in contact with formation 20 and mineral deposits 28, the oxidant oxidizes any reduced mineral values to a more readily soluble form, such as by oxidizing tetravalent uranium to hexavalent uranium, and the mineral values are solubilized in the leaching solution to form a pregnant liquor. After flowing through formation 20, the pregnant liquor enters well 12. Pump 36a pumps the pregnant liquor from well 12 through conduit 38a, header 40 and conduit 42 into pregnant liquor holding tank 44. Thus, during the injection-and-production phase of the method of this invention, the leaching solution is injected through at least one of a plurality of wells into the participating volume of formation 20 and pregnant liquor is simultaneously recovered from the participating volume of formation 20 via at least another of the plurality of wells.

During the production-only phase of the method of this invention, the injection of the leaching solution into the participating volume of formation 20 is suspended and additional pregnant liquor is recovered from the participating volume of formation 20 via at least one, and preferably all, of wells 10, 12 and 14. The pregnant liquor is pumped by pumps 36 through conduits 38, header 40 and conduit 42 to pregnant liquor holding tank 44. At least a portion of the pregnant liquor recovered during the production-only phase will comprise native ground water containing solubilized mineral values which has been drawn in from volumes of formation 20 outside the participating volume. In addition, the pregnant liquor will also include mineral-bearing liquid which had been delayed in passage through the low permeability strata of formation 20.

Figure 2:
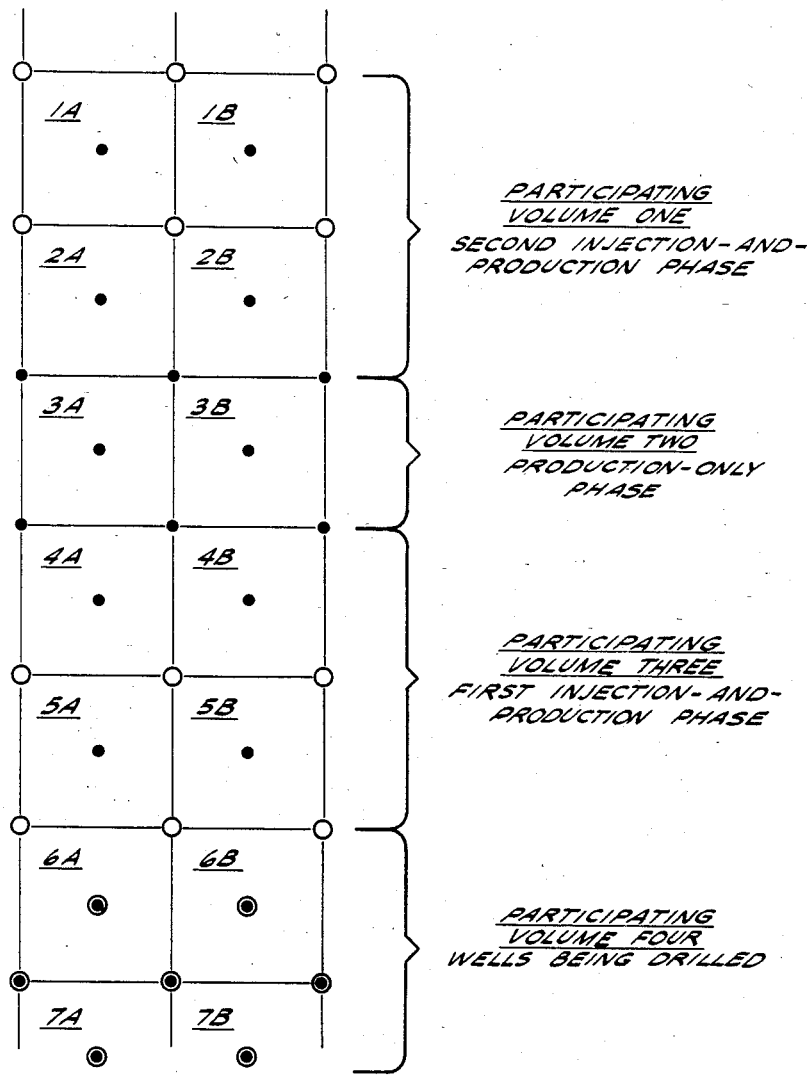
FIG. 2 is a plan view of the earth which schematically illustrates a plurality of five-spot surface well patterns employed in another embodiment of the method of this invention.

FIG. 2 illustrates the status of each well at one point in time during one preferred embodiment of the method of this invention. As illustrated, a plurality of wells penetrating a mineral-bearing formation, not shown, are arranged in five-spot well patterns, each of which has a central well and four perimeter wells spaced evenly about the central well at the corners of a square. The five-spot well patterns are arranged along a mineral trend, not shown, in seven adjacent rows, indicated as rows 1 through 7, and two adjacent columns, indicated as columns A and B. Each well pattern is identified by its row number and column letter. As is conventional, the perimeter wells serve two or more of the adjacent well patterns. The wells in the well patterns of rows 1 through 5 have been drilled and completed and are in use either for injection of the leaching solution or production of the pregnant liquor as indicated by the legend. On the other hand the wells of well patterns 6A, 6B, 7A and 7B have not all been drilled and completed and are therefore inactive.

Well patterns 1A, 1B, 2A and 2B are in a second injection-and-production phase of the method of this invention, having previously been exposed to an initial injection-and-production phase and a subsequent production-only phase. The portion of the mineral-bearing formation underlying and within the plan view periphery of well patterns 1A, 1B, 2A and 2B is identified in FIG. 2 as "Participating Volume One". During this second injection-and-production phase, six of the wells of well patterns 1A, 1B, 2A and 2B are employed as injection wells, as indicated by the legend, and seven of the wells are employed as production wells.

Participating Volume Two underlies and is within the plan view periphery of well patterns 3A and 3B. Well patterns 3A and 3B are in a production-only phase in which injection of the leaching solution into Participating Volume Two is suspended and all the wells in well patterns 3A and 3B are on production.

Participating Volume Three underlies well patterns 4A, 4B, 5A and 5B which are in an initial injection-and-production phase. Participating Volume Four will be involved in the operation upon completion of the wells for well patterns 6A, 6B, 7A and 7B.

As schematically demonstrated by FIG. 2, different participating volumes of a mineral-bearing formation may be in different phases of the method of this invention at any given time. This staggering of the phases is well adapted to a typical construction schedule for the wells and surface facilities for a commercial operation. Also this staggering of the phases serves to level out peaks in the demands on the pregnant liquor treating facilities and the leaching solution supply facilities which might otherwise occur. It should be understood, of course, that the number and location of well patterns shown in FIG. 2 are merely exemplary.

The selection of the number of well patterns to be in any particular phase of the method of this invention is a matter of choice usually determined by the response of the associated participating volume to each phase. Thus the number of participating volumes in an injection-and-production phase may be greater than, less than, or the same as the number of well patterns in a production-only phase. Also the length of time that a particular participating volume is involved in a given phase is a matter of choice. Injection-and-production phases of from about one month to about ten years in duration are suitable. Preferably this phase will last from about 0.5 to about 5 years, more particularly from about 1 to about 2 years. Typical production-only phases are expected to last from about one week to about two years. Preferably the production-only phase will last from about two weeks to about one year, more preferably from about one month to about four months. Normally, the well patterns in a production-only phase will be converted to an injection-and-production phase when the concentration of the desired mineral values in the pregnant liquor produced therefrom declines to an uneconomic level.

In another preferred embodiment of the method of this invention, each participating volume of the mineral-bearing formation is leached by alternating a plurality of injection-and-production phases with a plurality of production-only phases. In any event, after the last injection-and-production and/or production-only phase, the subterranean formation and the ground water contained therein are preferably restored to their preleach condition by recovering ground water from the participating volume through substantially all of the wells employed in the process. The restoration phase will typically continue until the liquid pumped from the wells is substantially equivalent in composition to the native ground water.

Within the basic process steps of the method of this invention, various modifications may be made which are expected to result in improved performance. One such modification involves the use of a well for the injection of leaching solution during the second injection-and-production phase which had been used for the production of pregnant liquor during the initial injection-and-production phase. Alternatively, or in addition, at least one well used for the injection of leaching solution during the first injection-and-production phase may be used for the production of pregnant liquor during the second injection-and-production phase. The ratio of injection wells to production wells in the second injection-and-production phase may be greater than, the same as, or less than the like ratio during the first injection-and-production phase.

Another modification designed to optimize mineral production in each phase involves adjusting the production rates from the individual wells during the production-only phase according to the concentration of the desired mineral in the pregnant liquor recovered from that well, i.e., the production rates from the wells producing pregnant liquor with high mineral value concentrations are increased and, if required, the other production rates are reduced in order to maximize the rate of mineral recovery. In a similar manner, during an injection-and-production phase the rate of leaching solution injection into individual wells may be advantageously adjusted in accordance with the change in mineral value concentration in the pregnant liquor which is observed to result therefrom.

In yet another preferred embodiment of the method of this invention the injection and production rates of each well pattern are controlled such that during the injection-and-production phases the total production rate exceeds the injection rate by an amount between about 5 and about 20 percent of the injection rate. The larger production rate serves to prevent leaching solution "excursions" into other subterranean formations and/or into more remote portions of the same formation which are not intended to be contacted with the leaching solution. Following this preferred procedure it is possible that the outermost volumes of the mineral-bearing formation will remain unleached. These outermost volumes can be leached by the method of this invention by instituting a "controlled excursion" into these volumes by injecting the leaching solution at an increased rate which exceeds the production rate for a short time near the end of an injection-and-production phase. The subsequent production-only phase serves to retrieve the fluid excursion thereby recovering additional mineral values without undesirable fluid excursions into the other formations or the more remote portions of the same formation.

Other methods for diverting the leaching solution to unleached volumes of the mineral-bearing formation are contemplated including the use of a diverting agent to plug the highly permeable strata of the formation after they have been exhausted in order to thereby divert the subsequently injected leaching solution to the previously unleached low permeability strata. Alternatively, a large slug of air may be injected both to oxidize some mineral values and to divert portions of the subsequently injected leaching solution.

The invention is further described by the following example which is illustrative of a specific mode of practicing the invention and is not intended as limiting the scope of the invention defined by the appended claims.

EXAMPLE

Uranium values are extracted from a sedimentary formation containing uranium-bearing mineral deposits in accordance with the method of this invention and substantially in accordance with the flow diagram illustrated in FIG. 1. The subterranean formation comprises a layer approximately 30 feet to 40 feet in thickness and is found at a depth ranging from about 350 feet to about 400 feet. The uranium values are present in a mixture of mineral forms including uraninite and coffinite. The normal water level of the native ground water is about 50 feet below the earth surface.

Wells 10, 12 and 14 are drilled and completed for fluid communication with mineral-bearing formation 20. Well 12 is completed to accommodate production therefrom, and wells 10 and 14 are completed to accommodate both injection and production.

During a first injection-and-production phase of about nineteen months, a dilute carbonic acid leaching solution containing an oxidant is injected through each of wells 10 and 14 at a rate of about 15 gallons per minute, while pregnant liquor is simultaneously recovered through well 12 at a rate of about 33.3 gallons per minute. The leaching solution has a pH of about 6.8 and contains about 620 ppm of bicarbonate ion and about 200 ppm on a free oxygen basis of the oxidant. The nominal concentration of uranium in the pregnant liquor recovered during the last several months of this first injection-and-production phase averages about 20 ppm as elemental uranium and the combined uranium production averages about 9.4 pounds of $U_3O_8$ per day.

Subsequently, during a production-only phase of about three months, the injection of leaching solution into formation 20 is suspended and additional pregnant liquor is recovered through each of wells 10, 12 and 14 at an initial rate of about 11 gallons per minute. The concentration of uranium in the pregnant liquor initially produced from wells 10, 12 and 14 is observed to be about 15 ppm, about 25 ppm and about 40 ppm as elemental uranium, respectively, for a combined uranium production of about 12.4 pounds of $U_3O_8$ per day. About ten days into this production-only phase, the production rates of wells 10, 12 and 14 are adjusted to about 6, about 11 and about 16 gallons per minute, respectively, in accordance with the measured uranium concentrations to thereby increase the combined uranium production to an average of about 14.2 pounds of $U_3O_8$ per day.

Thereafter, during a second injection-and-production phase, the dilute carbonic acid leaching solution is again injected through wells 10 and 14 and pregnant liquor is again recovered through well 12.

When further operation is deemed uneconomic due to the exhaustion of the uranium values in formation 12, the formation restoration phase is commenced by pumping liquid out of each of wells 10, 12 and 14 to thereby draw native ground water in from the formation surrounding the participating volume. After about five months, the water recovered from the wells is essentially equivalent to the native ground water prior to the solution mining operation and the operation is suspended.

This example demonstrates that the suspension of leaching solution injection during the production-only phase unexpectedly results in an improved rate of uranium recovery at a lower chemical cost.

While particular embodiments of the invention have been described, it will be understood, of course, that the invention is not limited thereto since many obvious modifications can be made, and it is intended to include within this invention any such modifications as will fall within the scope of the appended claims.

Having thus described the invention, I claim:

1. A method for the solution mining of mineral values from a mineral deposit contained in a subterranean formation, comprising the steps of:
   (a) providing a first plurality of wells penetrating said formation and adapted for fluid communication between the earth surface and a first participating volume of said formation, said first volume containing at least a portion of said mineral deposit;
   (b) during a first injection-and-production phase of said method, (1) injecting a dilute carbonic acid leaching solution through at least one of said first plurality of wells into said first volume to therein solubilize said mineral values and thereby from a pregnant liquor, and (2) recovering said pregnant liquor from said first volume through at least another of said first plurality of wells;
   (c) subsequently during a first production-only phase of said method, (1) suspending the injection of said leaching solution into said first volume, and (2) recovering additional pregnant liquor from said first volume through at least one of said first plurality of wells;

(d) thereafter during a second injection-and-production phase of said method, (1) injecting said leaching solution through at least one of said first plurality of wells into said first volume, and (2) recovering said pregnant liquor from said first volume through at least another of said first plurality of wells; and (e) separating said mineral values from the pregnant liquor recovered during steps (b), (c) and (d) to thereby form a barren liquor.

2. The method defined in claim 1 further comprising alternating a plurality of said injection-and-production phases with a plurality of said production-only phases.

3. The method defined in claim 1 wherein said subterranean formation also contains native ground water and said method further comprises the step of, after the last of said injection-and-production and production-only phases, restoring said subterranean formation substantially to its pre-leach condition by recovering said ground water from said first volume through substantially all of said first plurality of wells at least until the liquid so produced is substantially equivalent in composition to the native ground water.

4. The method defined in claim 1 wherein said mineral values are present in said mineral deposit in a relatively insoluble reduced state, and wherein said method further comprises the step of injecting an oxidant into said formation during at least one of said injection-and-production phases to therein oxidize said mineral values to a more readily soluble oxidized state.

5. The method defined in claim 4 wherein said oxidant is selected from the group consisting of potassium permanganate, hydrogen peroxide, potassium ferricyanide, sodium hypochlorite, potassium peroxydisulfate, oxygen and oxygen-containing gases.

6. The method defined in claim 4 wherein said oxidant is dissolved in said leaching solution to form an oxidant-containing leaching solution for introduction into said first volume.

7. The method defined in claim 6 wherein the concentration of said oxidant in said oxidant-containing leaching solution is between about 50 ppm on a free oxygen basis and the concentration at which said oxidant-containing solution is saturated with said oxidant upon introduction into said formation.

8. The method defined in claim 1 wherein said dilute carbonic acid leaching solution has a bicarbonate ion concentration between about 380 ppm and about 1,000 ppm and a pH less than 7.

9. The method defined in claim 1 wherein said dilute carbonic acid leaching solution has a bicarbonate ion concentration between about 460 ppm and about 700 ppm and a pH between about 6 and 7.

10. The method of claim 1 wherein said mineral values are selected from the group consisting of uranium, thorium, vanadium, copper, nickel, molybdenum, rhenium and selenium.

11. The method defined in claim 1 further comprising the step of, during said production-only phase, controlling the rate of pregnant liquor recovered from each of said first plurality of wells according to the concentration of said mineral values in the pregnant liquor recovered from each well so as to maximize the production of said mineral values.

12. The method defined in claim 1 wherein at least one of the wells employed for injection of said leaching solution during step (d) is a well which was employed for production of said pregnant liquor during step (b).

13. The method defined in claim 1 wherein at least one of the wells from which pregnant liquor is recovered during step (d) is a well into which leaching solution was injected during step (b).

14. A method for the solution mining of mineral values selected from the group consisting of uranium, thorium, vanadium, copper, nickel, molybdenum, rhenium and selenium, from a mineral deposit contained in a subterranean formation, said method comprising the steps of:

(a) providing a first plurality of wells penetrating said formation and adapted for fluid communication between the earth surface and a first participating volume of said formation, said first volume containing at least a portion of said mineral deposit;

(b) during a first injection-and-production phase of between about 0.5 and about 5 years, (1) injecting a dilute carbonic acid leaching solution through at least one of said first plurality of wells into said first volume to therein solubilize said mineral values and thereby form a pregnant liquor, and (2) recovering said pregnant liquor from said first volume through at least another of said first plurality of wells;

(c) subsequently during a first production-only phase of between about 2 weeks and about one year, (1) suspending the injection of said leaching solution into said first volume, and (2) recovering additional pregnant liquor from said first volume through at least one of said plurality of wells;

(d) thereafter during a second injection-and-production phase of between about 0.5 and about 5 years, (1) injecting said leaching solution through at least one of said first plurality of wells into said first volume, and (2) recovering said pregnant liquor from said first volume through at least another of said first plurality of wells;

(e) separating said mineral values from the pregnant liquor recovered during steps (b), (c) and (d) to thereby form a barren liquor;

(f) introducing carbon dioxide into at least a portion of said barren liquor; and (g) recycling at least a portion of the solution formed in step (f) for reintroduction into said formation as the leaching solution during at least one of said injection-and-production phases.

15. The method defined in claim 14 wherein said mineral values are present in said mineral deposit in a relatively insoluble reduced state, and wherein said method further comprises the step of injecting an oxidant selected from the group consisting of hydrogen peroxide, oxygen and oxygen-containing gases into said formation during at least one of said injection-and-production phases to therein oxidize said mineral values to a more readily soluble oxidized state.

16. The method defined in claim 15 wherein at least a portion of said oxidant is dissolved in said leaching solution to form an oxidant-containing leaching solution for introduction into said first volume, the concentration of said oxidant in said oxidant-containing leaching solution being between about 50 ppm on a free oxygen basis and the concentration at which said oxidant-containing solution is saturated with said oxidant upon introduction into said formation.

17. The method defined in claim 14 wherein said leaching solution has a pH less than 7 and a bicarbonate ion concentration between about 380 ppm and about 1000 ppm.

18. The method defined in claim 14 wherein at least one of the wells employed for injection of said leaching solution during step (d) is a well which was employed for production of said pregnant liquor during step (b), and wherein at least one of the wells employed for production of said pregnant liquor during step (d) is a well which was employed for injection of said leaching solution during step (b).

19. A method for the solution mining of uranium values from a mineral deposit contained in a subterranean formation, said mineral deposit being at least partially submerged in native ground water, said method comprising the steps of:
 (a) providing a first plurality of wells penetrating said formation and adapted for fluid communication between the earth surface and a first participating volume of said formation, said first volume containing at least a portion of said mineral deposit;
 (b) during a first injection-and-production phase of between about one and about two years, (1) injecting a dilute carbonic acid leaching solution through at least one of said first plurality of wells into said first volume to therein solubilize said uranium values and thereby form a pregnant liquor, said leaching solution having a pH less than about 7 and a bicarbonate ion concentration between 380 ppm and about 1000 ppm, and (2) recovering said pregnant liquor from said first volume through at least another of said first plurality of wells;
 (c) subsequently during a first production-only phase of between about one and about four months, (1) suspending the injection of said leaching solution into said first volume, and (2) recovering additional pregnant liquor from said first volume through at least one of said plurality of wells;
 (d) thereafter during a second injection-and-production phase of between about one and about two years, (1) injecting said leaching solution through at least one of said first plurality of wells into said first volume, and (2) recovering said pregnant liquor from said first volume through at least another of said first plurality of wells;
 (e) separating said uranium values from the pregnant liquor recovered during steps (b), (c) and (d) to thereby form a barren liquor;
 (f) introducing carbon dioxide into at least a portion of said barren liquor to thereby form a dilute carbonic acid solution; and
 (g) recycling at least a portion of the solution formed in step (f) for reintroduction into said formation as the leaching solution during at least one of said injection-and-production phases.

20. The method defined in claim 19 further comprising the step of introducing an oxidant selected from the group consisting of hydrogen peroxide, oxygen and oxygen-containing gases into at least a portion of said leaching solution to form an oxidant-containing leaching solution for introduction into said formation during at least one of said injection-and-production phases, the concentration of said oxidant in said oxidant-containing solution being between about 100 ppm and about 300 ppm on a free oxygen basis.

21. The method defined in claim 19 wherein at least one of the wells employed for injection of said leaching solution during step (d) is a well which was employed for production of said pregnant liquor during step (b), and wherein at least one of the wells employed for production of said pregnant liquor during step (d) is a well which was employed for injection of said leaching solution during step (b).

22. The method defined in claim 19 wherein said leaching solution has a pH between about 6 and 7 and a bicarbonate ion concentration between about 460 ppm and about 700 ppm.

23. The method defined in claim 1, 14 or 19 further comprising the steps of: (h) providing a second plurality of wells penetrating said formation and adapted for fluid communication between the earth surface and a second participating volume of said formation, said second volume containing at least a portion of said mineral deposit and being spaced from said first participating volume; (i) during a third injection-and-production phase of said method, (1) injecting said leaching solution through at least one of said second plurality of wells into said second volume, and (2) recovering said pregnant liquor from said second volume through at least another of said second plurality of wells; (j) subsequently during a second production-only phase of said method, (1) suspending the injection of said leaching solution into said second volume, and (2) recovering additional pregnant liquor from said second volume through at least one of said second plurality of wells; and (k) thereafter during a fourth injection-and-production phase of said method, (1) injecting said leaching solution through at least one of said second plurality of wells into said second volume, and (2) recovering said pregnant liquor from said second volume through at least another of said second plurality of wells; and wherein said third injection-and-production phase overlaps in time with said first production-only phase and said second injection-and-production phase overlaps in time with said second production-only phase.

24. An improved process for the solution mining of a mineral from a subterranean formation containing same in which an injection well and a production well are drilled and completed within said formation, leach solution and an oxidant are injected through said injection well into said formation to dissolve said mineral, and said dissolved mineral is recovered via said production well, wherein the improvement comprises employing as said leach solution a dilute carbonic acid solution and ceasing the injection of said leach solution while continuing production to alter the flow path of said leach solution in said formation between said injection and production wells and subsequently injecting said leach solution.

25. An improved process for the solution mining of a mineral from a subterranean formation containing same in which an injection well and a production well are drilled and completed within said formation, leach solution and an oxidant are injected through said injection well into said formation to dissolve said mineral, and said dissolved mineral is recovered via said production well, wherein the improvement comprises employing as said leach solution a dilute carbonic acid solution and periodically ceasing the injection of said leach solution subsequent to a decline in the concentration of said mineral in said solution recovered via said production well while continuing production to alter the flow path of said leach solution in said formation between said injection and production wells and subsequently injecting said leach solution.

* * * * *

UNITED STATES PATENT AND TRADEMARK OFFICE
CERTIFICATE OF CORRECTION

PATENT NO. : 4,586,752
DATED : May 6, 1986
INVENTOR(S) : William E. Showalter

It is certified that error appears in the above-identified patent and that said Letters Patent are hereby corrected as shown below:

In column 10, line 59, change "from" to -- form --.

In column 13, line 25, delete "about".

In column 13, line 26, between "between" and "380" insert -- about --.

Signed and Sealed this

Twenty-third Day of September 1986

[SEAL]

Attest:

DONALD J. QUIGG

Attesting Officer  Commissioner of Patents and Trademarks